(12) United States Patent
Heidebach et al.

(10) Patent No.: US 10,080,380 B2
(45) Date of Patent: Sep. 25, 2018

(54) PROCESS OF PREPARING A CONCENTRATED LIQUID FOODSTUFF

(75) Inventors: Thomas Heidebach, Edingen-Neckarhausen (DE); Christine Keller, Schwetzingen (DE); Matthias Sass, Oftersheim (DE); Axel De With, Plankstadt (DE)

(73) Assignee: ADM WILD EUROPE GMBH & CO. KG, Eppelheim (DE)

( * ) Notice: Subject to any disclaimer, the term of this patent is extended or adjusted under 35 U.S.C. 154(b) by 105 days.

(21) Appl. No.: 14/123,936

(22) PCT Filed: May 21, 2012

(86) PCT No.: PCT/EP2012/002157
§ 371 (c)(1),
(2), (4) Date: Feb. 28, 2014

(87) PCT Pub. No.: WO2012/167872
PCT Pub. Date: Dec. 13, 2012

(65) Prior Publication Data
US 2014/0170262 A1    Jun. 19, 2014

(30) Foreign Application Priority Data

Jun. 9, 2011 (EP) .................................... 11004722

(51) Int. Cl.
*A23L 2/385*    (2006.01)
*A23L 29/30*    (2016.01)
(Continued)

(52) U.S. Cl.
CPC ................. *A23L 2/385* (2013.01); *A23L 2/54* (2013.01); *A23L 2/84* (2013.01); *A23L 5/00* (2016.08);
(Continued)

(58) Field of Classification Search
CPC . A23L 1/23; A23L 1/1055; A23L 1/28; A23L 1/2128; A23L 2/385; A23L 2/54
See application file for complete search history.

(56) References Cited

U.S. PATENT DOCUMENTS 3,935,071 A    1/1976  Bergmeyer et al.
4,362,757 A *  12/1982 Chen ........................ A23L 2/39
                                                                127/29
(Continued)

FOREIGN PATENT DOCUMENTS

DE    2214442 A1    10/1973
EP    0017708 A2    10/1980
(Continued)

OTHER PUBLICATIONS

Haight et al., "Red and White Grape Juice Concentrate Component Ranges," *Journal of Food Composition and Analysis* 8: 71-77 (1995).
(Continued)

*Primary Examiner* — Felicia C Turner
(74) *Attorney, Agent, or Firm* — Seed IP Law Group LLP

(57) ABSTRACT

This invention relates to a process of preparing a concentrated liquid foodstuff comprising treating a sugar solution or a concentrate or an extract having a Brix of more than 20°, with carbohydrate oxidase and catalase without adjusting the pH before or during the treatment by addition of buffering substances or basic substances, to obtain a concentrated liquid foodstuff, wherein the final pH is lower than 3.

14 Claims, 3 Drawing Sheets

(51) Int. Cl.

| | | |
|---|---|---|
| *A23L 7/00* | (2016.01) | |
| *A23L 5/00* | (2016.01) | |
| *A23L 2/54* | (2006.01) | |
| *A23L 2/84* | (2006.01) | |
| *A23L 7/104* | (2016.01) | |
| *A23L 19/00* | (2016.01) | |
| *A23L 27/24* | (2016.01) | |
| *A23L 31/00* | (2016.01) | |
| *A23L 21/00* | (2016.01) | |

(52) U.S. Cl.
CPC ............... *A23L 7/00* (2016.08); *A23L 7/107* (2016.08); *A23L 19/09* (2016.08); *A23L 27/24* (2016.08); *A23L 29/30* (2016.08); *A23L 31/00* (2016.08); *A23L 21/00* (2016.08)

(56) References Cited

U.S. PATENT DOCUMENTS

| | | | |
|---|---|---|---|
| 4,460,686 A | | 7/1984 | Hartmeier |
| 4,647,388 A | | 3/1987 | Schreiber |
| 4,675,191 A | * | 6/1987 | Villettaz .................. C12G 3/08 426/10 |
| 5,897,995 A | * | 4/1999 | Vroemen ............. C12N 9/0006 435/134 |
| 2004/0166223 A1 | * | 8/2004 | Muralidhara ............. A23L 2/06 426/599 |
| 2006/0240147 A1 | * | 10/2006 | Padhye .................... C12C 5/00 426/16 |
| 2008/0145501 A1 | * | 6/2008 | Brown ...................... A23L 2/38 426/533 |
| 2012/0328734 A1 | | 12/2012 | Berberich et al. |

FOREIGN PATENT DOCUMENTS

| | | |
|---|---|---|
| EP | 0 184 043 A2 | 6/1986 |
| EP | 2 330 929 B1 | 6/2012 |
| EP | 2 424 390 B1 | 4/2013 |
| RU | 2008 142 273 A | 3/2007 |
| WO | WO 96/35800 A1 | 11/1996 |
| WO | WO 97/24454 A1 | 7/1997 |
| WO | WO 03/031635 A1 | 4/2003 |
| WO | WO 2007/106731 A2 | 9/2007 |
| WO | WO 2007/115867 A2 | 10/2007 |
| WO | WO 2009/016049 A1 | 2/2009 |
| WO | WO 2010/106170 A1 | 9/2010 |

OTHER PUBLICATIONS

Bankar et al., "Glucose oxidase—An overview," *Biotechnology Advances* 27: 489-501, 2009.

Gibson et al., "Kinetics and Mechanism of Action of Glucose Oxidase," *The Journal of Biological Chemistry* 239(11): 3927-3934, Nov. 1964.

Hatzinikolaou et al., "A new glucose oxidase from *Aspergillus niger*: characterization and regulation studies of enzyme and gene," *Appl. Microbiol. Biotechnol.* 46: 371-381, 1996.

Mirón et al., "A mathematical model for glucose oxidase kinetics, including inhibitory, deactivant and diffusional effects, and their interactions," *Enzyme and Microbial Technology* 34: 513-522, 2004.

Vroemen, "Glucose Oxidase," in Whitaker et al. (eds.) *Handbook of Food Enzymology*, Marcel Dekker, New York, NY, pp. 425-432.

Wong et al., "Glucose oxidase: natural occurrence, function, properties and industrial applications," *Appl. Microbiol. Biotechnol.* 78: 927-938, 2008.

Official Action from Patent Office of Russia, dated Mar. 19, 2015, for Patent Application No. 2013150922, 6 pages (with English translation).

Codex General Standard for Fruit Juices and Nectars (Codex Stan 247-2005), pp. 1-19, (2005), Codex Alimentarius International Food Standards.

* cited by examiner

PROCESS OF PREPARING A CONCENTRATED LIQUID FOODSTUFF

CROSS-REFERENCE TO RELATED APPLICATIONS

This application is a U.S. national stage application filed under 35 U.S.C. § 371 of International Patent Application PCT/EP2012/002157, accorded an international filing date of May 21, 2012, which claims the benefit of European Patent Application No. EP 11004722.2, filed Jun. 9, 2011.

FIELD OF THE INVENTION

This invention relates to a process of preparing a concentrated liquid foodstuff having a pH of less than 3 from a solution or concentrate or extract having a Brix of more than 20°.

BACKGROUND OF THE INVENTION

The enzymatic conversion of sugar into acids with the help of carbohydrate oxidase and catalase finds many technological applications, particularly in the food industry. In some applications the carbohydrate oxidase is used to remove oxygen from a food product in order to preserve its quality. In other applications, the reduction of sugar content of the food product is desired.

The enzymatic conversion of sugar into acids involves an oxidation/reduction reaction, catalyzed by carbohydrate oxidase, in which oxygen serves as an electron acceptor. The oxygen is reduced to hydrogen peroxide ($H_2O_2$): sugar+$O_2$+$H_2O$→sugar acids+$H_2O_2$. The enzyme catalase catalyzes the reaction: $H_2O_2$→$H_2O$+½$O_2$.

If the production of a sufficient amount of acids is desired, the addition of catalase is necessary for the removal of hydrogen peroxide, which is an inhibitor of carbohydrate oxidase. It is also required that the reaction medium is continuously supplied with oxygen because the latter is consumed by the reaction. The amount of oxygen can be used to determine the optimal incubation time for the process.

A well studied carbohydrate oxidase is glucose oxidase (EC 1.1.3.4, GOX). Gluconic acid can be obtained by transforming glucose into gluconic acid using glucose oxidase. This occurs via the production of glucono-δ-lactone in an aqueous media when oxygen is available. Furthermore, $H_2O_2$ is produced from the reaction, which effectively inhibits GOX at already very low concentrations. On this account, it is common that GOX is used in combination together with the enzyme catalase (EC 1.11.1.6, CAT), which is capable of converting $H_2O_2$ into $H_2O$ and oxygen (Miron et al., 2004, Wong et al., 2008).

Reaction of GOX: glucose+$O_2$+$H_2O$→gluconic acid+2$H_2O_2$ and of CAT: $H_2O_2$→$H_2O$+½$O_2$.

Due to the acid production, the enzymatic reaction process is generally limited by consecutive lowering of the pH-value, finally leading to inactivation of the enzyme, if no buffering substances are added (Miron et al, 2004). Thus, in biotechnological applications of enzymatic gluconic acid production by means of GOX and CAT, the pH is generally stabilized within the optimum range of enzyme activity by the addition of buffering substances or basic substances to achieve maximum transfer rates, as, for example, pointed out in WO-A-9635800 and DE-A-2214442.

In most ready-to-drink beverages (e.g. soft drinks, fermented drinks), the acid content as well as the sugar-to-acid ratio has to be in a defined, narrow range, to achieve an acceptable or even optimized sensorial impression. In the case of ready-to-drink beverages, the optimal sugar-to-acid ratio can be achieved by the production of sufficient amounts of acid under optimized reaction conditions by means of carbohydrate oxidase.

Although moderate glucose concentrations are applied in many GOX applications, highly concentrated glucose solutions are suitable as a substrate as well. In beverage concentrates, from which above mentioned ready to drink beverages can be obtained by dilution with water, the acid concentration (as well as the sugar content and all other ingredients) is several times higher compared to ready-to-drink beverages, leading to a much lower pH of the concentrate compared with the ready-to-drink beverage produced from it.

Under recommended optimal reaction conditions (recommended temperature and/or pH range), it is not possible to generate sufficient amounts of gluconic acid required for the beverage concentrate before the pH value is too low to obtain further enzymatic activity. Therefore, these applications resort to the addition of a buffering or basic substance to keep the pH of the concentrate constant and within the optimum enzyme activity range. In the case of beverages however, the use of buffers or bases to maintain the pH within the optimum range is not always suitable due to the possible negative sensorial impact.

For commercial GOX-preparations, recommended reaction conditions in terms of pH are in the range 4 to 7 pH, independent of the enzyme origin. Like any other enzyme, GOX from different origins can differ in their structure and hence their optimum conditions (Miron et al., 2004). GOX is mainly produced by *Aspergillus* or *Penicillium* subspecies. Almost all GOX preparations available on the market are produced by *Aspergillus Niger* (Handbook of Food Enzymology). For GOX from *Aspergillus Niger*, the pH of maximum stability was found to be around 5.5 (Miron et al., 2004). At pH lower than 3, the half-life of commercial *Aspergillus Niger* GOX has been found to be less than 20 minutes under assay conditions (Hatzinikolaou et al., 1996). The optimum temperature of GOX from various microbial sources has been reported to be between 25° C.-60° C. (Gibson et al., 1964, Wong et al., 2008, Bankar et al., 2009). Thus, it is usually the case that shifting the reaction conditions out of the optimum stops the reaction almost completely.

Several patents describe the combined use of GOX/CAT for the production of gluconic acid in beverages. For example, WO-A-2010106170 describes the use of GOX to produce an acidic beverage. The authors recommend reaction temperatures between 25° C. and 45° C. and the addition of a base to maintain the pH at a suitable constant value between 3.0 and 9.0 to increase the yield of gluconic acid. EP-A-0017708 suggests the use of reaction temperatures between 0° C. and 10° C. for the production of gluconic acid with immobilized GOX/CAT combination. The applicants emphasize that the pH value must remain constantly within the optimum region of pH 4-7, e.g. by means of the automatic addition of NaOH during the process. WO-A-97/24454 relates to the production of gluconic acid from glucose. The authors further recommend maintaining the pH of the glucose solution at from about 5 to about 7. WO-A-03/031635 describes the formation of calcium gluconate by converting glucose in gluconic acid in the presence of a calcium base, such as calcium oxide, calcium hydroxide and/or calcium carbonate, to neutralize the gluconic acid and to serve as calcium source. Thus, the processes claimed in these applications involve working under optimum enzyme activity conditions, achieved by buffering the pH to prevent inhibition due to low pH-values. WO-A-2009016049 describes a method for impeding oxidation reactions in food products by production of maltobionate from starch or maltose by an enzymatic process. Maltose is converted to maltobionate in the presence of carbohydrate oxidases, such as aldose oxidase, cellobiose oxidase, pyranose oxidase and hexose oxidase. Furthermore, catalase may be added to eliminate unwanted $H_2O_2$.

Accordingly, an object of this invention is to overcome the disadvantages outlined above and to provide a process of preparing a concentrated liquid foodstuff having a sufficient amount of acids without the addition of taste deteriorating buffering or basic substances, which control the pH during the sugar oxidation process.

DETAILED DESCRIPTION OF THE INVENTION

Figure 1:
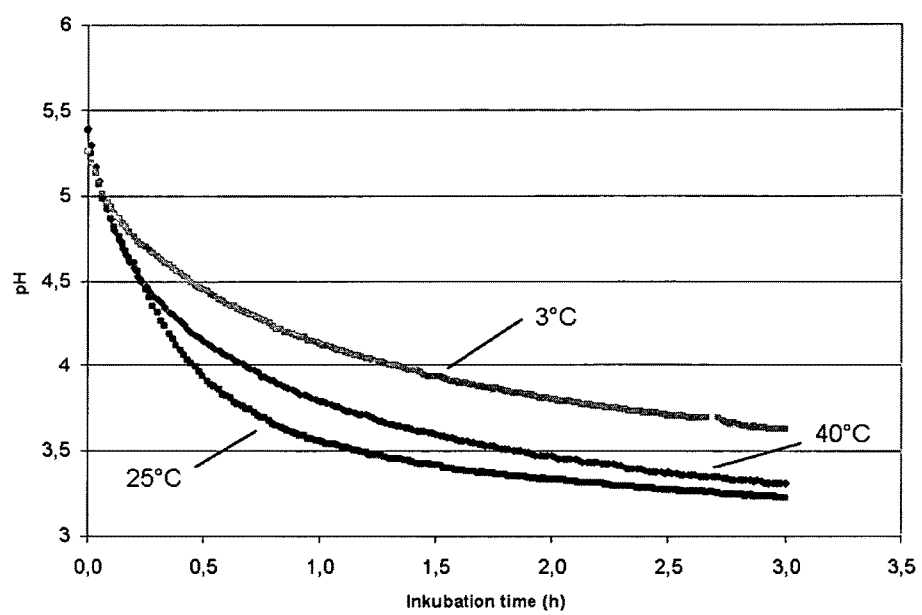
FIG. 1 illustrates the rate of gluconic acid production at various temperatures, expressed as reduction of pH in time.

Said object is solved by a process according to claim 1 or 3. The present invention also provides a concentrated liquid foodstuff and a ready-to-drink composition.

The present invention is based on the finding that when a carbohydrate oxidase and catalase is used in the production of acids in certain beverage concentrates under conditions which are shifted far away from the optimum enzyme activity conditions in terms of pH (e.g. 2-3) and temperature (e.g. 0-20° C.) the enzyme is still able to produce acids in considerable amounts.

The inventors have developed a process of preparing a concentrated liquid foodstuff having a pH of less than 3, preferably a pH of less than 2.5, without adding buffering or basic substances. The process of the present invention comprises the treatment of a sugar solution having a Brix of more than 20° with carbohydrate oxidase and catalase.

A further embodiment of the present invention relates to a process of preparing a concentrated liquid foodstuff comprising treating at least one liquid juice concentrate and/or at least one extract from fruits, berries, vegetables, herbs, nuts, spices, fungi, cereals, or crop products, said concentrate or extract having a Brix of more than 20°, with carbohydrate oxidase and catalase, without adjusting the pH before or during the treatment by addition of buffering substances or basic substances to obtain a concentrated liquid foodstuff, wherein the final pH is lower than 3.

A "liquid juice concentrate" is obtained by selective removal of water from juice until the amount of water remaining in the concentrate is from 20 to 80% by weight based on the liquid juice concentrate. The term "extract" is used representatively for all products that are obtained by means of an extraction with a solvent, such as with maceration or percolation. The concentrate or extract is obtained from fruits, berries, vegetables, herbs, nuts, spices, fungi, cereals, or crop products. Examples therefore are given above. The production of liquid juice concentrates is a common practice and well-known by the skilled in the art. It can be carried out by any process resulting in a higher Brix value of the juice after the process. Examples for common concentration methods are filtration and evaporation. The terms "liquid juice concentrate" and "extract" also refer to water extracted soluble solids, fruit juice concentrates, comminutes and purees.

The solution or concentrate or extract used in process of the present invention contains sugar. In the context of the present invention, the term "sugar" represents a general term for sweet tasting saccharides, mixtures of said sweet tasting saccharides and water solutions thereof. Suitable sugars include maltose, lactose, glucose, hexose, hydrolyzed saccharose concentrate, invert sugar syrup, glucose syrup, natural fruit sugar from fruit juice and fruit juice concentrate (e.g. Fruit-Up®). Preferred sugars are glucose, lactose and hexose of which glucose is most preferable.

In a preferred embodiment in combination with any of the above or below embodiments the solution used in the present invention further contains at least one component selected from the group consisting of fruits, berries, vegetables, herbs, nuts, spices, fungi, cereals (grains), and crop products.

Suitable fruits are, for example apple, passion fruit, pear, peach, plum, apricot, nectarine, grape, cherry, lemon, lime, mandarin, tangerine, orange, grapefruit, tomato, cucumber, pineapple, pomegranate, kiwi, mango, papaya, banana, watermelon, cantaloupe, acerola, blood orange, carob, cherimoya, citrus, dragonfruit, fig, guave, honeydew melon, kaki, lychee, mangosteen, melon, mirabelle, olive, paprika, physalis, prickly pear, pumpkin, quince, starfruit.

Suitable berries are, for example, cranberry, currant, raspberry, gooseberry, blackberry, blueberry, strawberry, acai, aronia berry, black currant, boysenberry, elderberry, goji, lingonberry, mulberry, red currant, rosehip, rowan berry, sea buckthorn, sloe, whitethorn and wood berries.

Suitable vegetables are, for example, potato, lettuce, celery, spinach, cabbage, watercress, rhubarb, carrot, beet, asparagus, beetroot, broccoli, endive, fennel, horseradish, leek, onion, pea and spinach.

Suitable herbs are, for example, dandelion, aloe vera, fennel, ginco, green tee, hibiscus, mallow, rooibos, leaves and tea.

Suitable nuts are, for example, coconut, chestnut, almond, cashew, hazelnut, macadamia, peanut, pecan, pine nut, pistachio, walnut.

Suitable spices are, for example, cinnamon, ginger, liquorice and vanilla.

Suitable cereals are, for example, barley, flaxseed, bran, maize, millet, oat, rice, rye, wheat, corn and malt.

Suitable crop products are, for example, beans, cacao, cassia, coffee, ginseng, guarana, honey, lenses, lotus, poppy seed, sunflower, soy, and tamarind.

Further suitable components are water extractions, comminutes, parts, purees and fermented parts obtained from above described fruits, berries, vegetables, herbs nuts, spices, fungi and cereals. Preferred components are herbs, fermented cereals and fermented fruits, of which herbs are most preferable.

In a preferred embodiment in combination with any of the above or below embodiments, at least one component selected from the group consisting of fruits, berries, vegetables, herbs, nuts, spices, fungi, cereals (grains), and crop products may be added to the concentrated liquid foodstuff after treatment with carbohydrate oxidase and catalase.

In combination with any of the above or below embodiments the solution or concentrate or extract used according to the present invention has a Brix of more than 20°, preferably a Brix of at least 25°, more preferably a Brix of at least 30°, and most preferably a Brix of at least 35°.

The term "°Brix" (degrees Brix) refers to a unit representing the sugar content of a solution. One degree Brix corresponds to 1 gram of sugar in 100 grams of solution and thus represents the sugar concentration of the solution as a percentage by weight (% w/w). The °Brix is usually measured by means of a refractometer.

In the process of the present invention the solution or concentrate or extract is treated with carbohydrate oxidase. The term "carbohydrate oxidase" refers to an oxidoreductase which has substrate specificity for carbohydrates. Oxidoreductases are enzymes that catalyze the transfer of electrons from one molecule to another. Oxidases belong to the enzyme class of oxidoreductases. Unless anything else is suggested, the enzymes described below and throughout the description are isolated enzymes with co-factor, if required.

One category of oxidoreductases, suitable for use in the present invention, are carbohydrate oxidases that catalyze an oxidation/reduction reaction involving molecular oxygen ($O_2$) as the electron acceptor. In these reactions, oxygen is reduced to water ($H_2O$) or hydrogen peroxide ($H_2O_2$).

In particular, carbohydrate oxidases that catalyse the conversion of glucose to glucono-δ-lactone that immediately decomposes in water to form corresponding aldonic acids. The process generates hydrogen peroxide. An aldonic acid is any of a family of sugar acids obtained by oxidation of the aldehyde functional group of an aldose to form a carboxylic acid functional group. Thus, their general chemical formula is $HOOC-(CHOH)_n-CH_2OH$. Aldonic acids include, for example, gluconic acid.

The carbohydrate oxidase enzymes convert the sugar in the solution or concentrate or extract to their respective sugar acids. A number of suitable carbohydrate oxidases capable of converting sugar to sugar acids are known and available to the skilled person. Examples of such carbohydrate oxidases are glucose oxidase (EC 1.1.3.4), lactose oxidase, cellobiose oxidase (EC1.1.99.18), pyranose oxidase (EC1.1.3.10), and hexose oxidase (EC1.1.3.5). Glucose oxidase, hexose oxidase and lactose oxidase are preferred, of which glucose oxidase is most preferred.

The amount of oxidase to be used will generally depend on the specific requirements and on the specific enzyme. The amount of oxidase addition preferably is sufficient to generate the desired degree of conversion of sugar to its acid within a specified time. Typically, a carbohydrate oxidase addition in the range from 500 to 50000 ppm per kg of sugar is sufficient, particularly from 2000 to 20000 ppm per kg of sugar, and more particularly from 5000 to 15000 ppm per kg of sugar.

In a preferred embodiment in combination with any one of the above or below listed embodiments, the activity of carbohydrate oxidase is from 1000 units/g to 50000 units/g, more preferably from 1650 units/g to 10000 units/g, in particular 10000 units/g. Particularly preferably the enzyme is glucose oxidase with an activity of from 1650 units/g to 10000 units/g.

The enzyme activity is measured in "units/g", wherein 1 unit is defined as the amount of enzyme, which converts 1 micromole of substrate in a minute, i.e. 1 unit=1 μmol/min under standard assay conditions, i.e. optimum conditions in terms of pH and temperature. Another measure of the catalytic activity of an enzyme is "katal", 1 katal=1 mol/s, 1 unit=16.67×10$^{-9}$ katal. The enzyme activity given herein refers to the activity of enzyme preparations, wherein the pure enzyme is mixed with a carrier material, such as maltodextrin.

According to the process of the present invention a catalase (EC 1.1 1.1.6) is added in combination with any of the above or below embodiments. Catalase is added to prevent limitation of the reaction driven by the carbohydrate oxidase and to eliminate unwanted $H_2O_2$ in the end-product. As described above carbohydrate oxidase is dependent on oxygen, but produces hydrogen peroxide. The advantage of adding catalase to the process of the present invention is that the carbohydrate oxidase is provided with oxygen and at the same time is the hydrogen peroxide which has strong oxidizing properties removed.

In a preferred embodiment in combination with any one of the above or below listed embodiments, the activity of catalase is from 10000 units/g to 100000 units/g, more preferably from 16500 units/g to 65000 units/g, in particular 25000 units/g.

In one embodiment of the invention, the carbohydrate oxidase and the catalase are added at the same time. In another embodiment, the enzymes are added at different times, for example, the carbohydrate oxidase is added first and after some time the catalase is added. However, in the latter case, one has to contend with the generated $H_2O_2$, which might damage the liquid beverage concentrate and also the enzyme activities.

In combination with any of the above or below embodiments catalase is added in an amount that lowers the concentration of $H_2O_2$ as compared to a similar process without catalase. Preferably, the amount of catalase added to the process as described herein, is an amount that is sufficient to obtain at least 25%, 50%, 75%, 85% or 95% decrease in the amount of $H_2O_2$ as compared to a comparative control process where the only comparative difference is that catalase is not added, even more preferably the amount of catalase added to the process as described herein, is an amount that is sufficient to obtain a 100% decrease in the amount of $H_2O_2$ as compared to a comparative control process, where the only comparative difference is that catalase is not added. Preferably, the catalase is added in an amount that also improves the degree of conversion of sugars to its acids.

The amount of oxidase to catalase to be used will generally depend on the specific requirements and on the specific enzyme activity (units per gram) of the selected enzyme preparation. It can be determined and adapted to the process of the present invention by a person skilled in the art. Specific enzyme activities can vary for different enzyme preparations, but are in a specific range from which a person skilled in the art can deduce optimized ratios of oxidase and catalase in ppm per kg of substrate (sugar). Against this background, the activity ratios of oxidase and catalase should be in the range of 1:1 to 1:100.

The treatment of the solution or concentrate or extract is performed under conditions allowing the carbohydrate oxidase to convert sugars to sugar acids. Such conditions include temperature, pH, characteristics of carbohydrate oxidase and catalase.

In a preferred embodiment in combination with any of the above or below embodiments, the pH of the concentrated liquid foodstuff is not buffered or otherwise adjusted during the process, e.g. by means of addition of alkali (base) or buffers during the process or e.g. by means of partially removing produced acid from the process media.

Substances capable of neutralizing the produced acid are not added during the present process, e.g. no bases such as Ca(OH)$_2$, KOH, NaOH, Mg(OH)$_2$, CaCO$_3$, MgCO$_3$, Mg(OH)$_2$, Na$_2$CO$_3$, K$_2$CO$_3$, (NH$_4$)$_2$CO$_3$ and NH$_4$OH, NaHCO$_3$, KHCO$_3$ are added during the treatment of the solution or concentrate or extract with oxidase and catalase.

Substances capable of buffering the produced acid are not added during the present process, e.g. no buffering substances such as sodium phosphate buffer, carbonate buffer, sulfate buffer, lactate buffer and citrate buffer are added before or during the treatment of the solution or concentrate or extract with carbohydrate oxidase and catalase.

In combination with any of the above or below embodiments, the solution or concentrate or extract having a Brix of more than 20°, may further contain water, fruit juice concentrate, thickener, color, stabilizer, emulsifier, sweetener, high intensity sweetener, extracts from fresh or fermented plants or parts of plants and extracts from fresh or fermented fruits, berries, vegetables, herbs, nuts, spices, fungi and cereals. These can serve for example, the purpose of color and flavor providing substances.

According to the invention, the term "flavor" refers to those flavors derived from the edible reproductive part of a seed plant, especially one having a sweet pulp associated with the seed, for example, apples, oranges, lemon, limes. It also includes flavors derived from parts of the plant other than the fruit, for example, flavors derived from nuts, bark, roots and leaves. Also included within this term are synthetically prepared flavors made to simulate flavors derived from natural sources. Examples of flavoring agents include cola flavors, tea flavors, cinnamon, all-spice, clove, coffee flavors, citrus flavors including orange, tangerine, lemon, lime and grape fruit flavors. A variety of other fruit flavors can also be used such as apple, grape, cherry, pineapple, coconut and the like. Fruit juices, including orange, lemon, tangerine, lime, apple and grape can be used as the flavoring agent.

Suitable stabilizers, colors, sweeteners and flavors are apple, passion fruit, cranberry, pear, peach, plum, apricot, nectarine, grape, cherry, currant, raspberry, gooseberry, blackberry, blueberry, strawberry, lemon, lime, mandarin, tangerine, orange, grapefruit, potato, tomato, lettuce, celery, spinach, cabbage, watercress, dandelion, rhubarb, carrot, beet, cucumber, pineapple, coconut, pomegranate, kiwi, mango, papaya, banana, watermelon, cantaloupe or tea. barley, flaxseed, bran, maize, millet, oat, rice, rye, wheat, corn, lenses, malt, acai, acerola, aloe vera, apple, apricot, aronia berry, asparagus, banana, bean, beet, beetroot, black currant, black berry, blood orange, blueberry, boysenberry, broccoli, cabbage, cacao, cantaloupe, carob, carrot, cassia, celery, dandelion, cherimoya, cherry, chestnut, cinnamon, citrus, coconut, coffee, tea, cranberry, cucumber, currant, dragonfruit, elderberry, endive, fennel, fig, ginger, ginco, ginseng, goji, gooseberry, grape, grapefruit, guarana, guave, hibiscus, honey, honeydew melon, horseradish, kaki, kiwi, leek, lemon, lettuce, lime, lingonberry, liquorice, lotus, lychee, mallow, mandarin, tangerine, mango, mangosteen, melon, mirabelle, mulberry, nectarine, almond, cashew, hazelnut, macadamia, peanut, pecan, pine nut, pistachio, potato, walnut, olive, onion, orange, papaya, paprika, passion fruit, pea, peach, pear, physalis, pineapple, plum, pomegranate, poppy seed, prickly pear, pumpkin, quince, raspberry, red currant, rhubarb, rooibos, rosehip, rowan berry, spinach, sea buckthorn, sloe, soy, starfruit, strawberry, sunflower, tamarind, tangerine, tomato, vanilla, watercress, watermelon, whitethorn, wood berries.

Preferably, the process starts at a temperature of 10° to 30° C. and the temperature is lowered during the process to 0° to 10° C. as soon as the pH is lower than 4. The pH is usually measured by means of a pH meter.

Also a constant temperature between 0° and 30° C. can be maintained throughout the process. A preferable constant temperature is between 1° and 10° C., and a most preferable constant temperature is between 2° and 6° C.

In the process of preparing the concentrated liquid foodstuff of the present invention the treatment may be conducted several times. Thus, the treatment of the solution or concentrate or extract with carbohydrate oxidase and catalase may be repeated several times, until a sufficient amount of acid is produced to reach a pH lower than 3, preferably to reach a pH lower than 2.5.

A suitable treatment (incubation) time should allow the degree of conversion of sugars to acids of interest. A single treatment (incubation) or several treatments of the solution or concentrate or extract with carbohydrate oxidase and catalase are possible. Generally, a suitable single treatment (incubation) time is selected in the range from 1 hour to 5 days, preferably, from 10 hours to 4 days, most preferably from 36 hours to 3 days. Generally, a suitable several treatments (incubations) time is selected in the range from 1 day to 21 days.

A particularly preferred process of preparing a concentrated liquid foodstuff comprises treating a solution or concentrate or extract comprising glucose and tea, said solution or concentrate or extract having a Brix of 35° or higher, with glucose oxidase and catalase, without adjusting the pH before or during the treatment by addition of buffering substances or basic substances to obtain a concentrated liquid foodstuff, wherein the final pH is lower than 2.5.

The process may be carried out under constant supply of oxygen by pumping air in the solution or concentrate or extract being treated. Any conventional air pumping apparatus can be used.

Carrying out the process under any combination of the above mentioned conditions, i.e., temperature conditions, initial sugar content of the solution or concentrate or extract and consecutive treatments of the solution or concentrate or extract with carbohydrate oxidase and catalase, is acceptable, as long as the values of these quantities fall in the respective ranges stated above (e.g. temperature of 0-30° C., a Brix of more than 20°), and the resulting concentrated liquid foodstuff has the desired acidity of pH lower than 3. Combinations which lead to short incubation times, simplified process in term of steps performed and cost effectiveness, are preferred.

Preferably, the concentrated liquid foodstuff contains active starter cultures that are used for fermentation purposes. An active starter culture is a microbiological culture which actually performs the fermentation. These starters usually consist of a cultivation medium, such as grains, seeds, or nutrient liquids that have been well colonized by the microorganisms used for the fermentation. Suitable active starter cultures are selected from the group of the family of lactobacillaceae, bifodobacteriaceae, Acetobacteraceae, *Rhizopus, Aspergillus, Candidia, Geotrichum, Penicillium* and *Saccharomyces*, wherein a gluconobacter subspecies of Acetobacteraceae is preferred.

In a preferred embodiment, in combination with any one of the embodiments listed above or below, in the process according to the present invention, the concentrated liquid foodstuff is subsequently treated with an active starter culture for fermentation purposes. Suitable active starter cultures are selected from the group of the family of lactobacillaceae, bifodobacteriaceae, Acetobacteraceae, *Rhizopus, Aspergillus, Candidia, Geotrichum, Penicillium* and

*Saccharomyces*, wherein a gluconobacter subspecies of Acetobacteraceae is preferred. More preferably the active starter culture is selected from the group of *Saccharomyces*. Particularly preferable, the active starter culture is *Saccharomyces cerevisiae*.

Another embodiment of the present invention is the concentrated liquid foodstuff obtainable by the process of the present invention.

Another embodiment of the present invention is a ready-to-drink composition containing a diluent and the concentrated liquid foodstuff obtained by the process of the present invention.

Suitable diluents are water (including carbonated water), fruit juice and/or additional substances of the group of stabilizer, color, sweetener, thickener and flavor.

According to the present invention, the term "fruit juice" suitable as a diluent refers to citrus and non-citrus juices including vegetable juices. The fruit juice can be provided as juice made from, for example, apple, passion fruit, cranberry, pear, peach, plum, apricot, nectarine, grape, cherry, currant, raspberry, gooseberry, blackberry, blueberry, strawberry, lemon, lime, mandarin, tangerine, orange, grapefruit, potato, tomato, lettuce, celery, spinach, cabbage, watercress, dandelion, rhubarb, carrot, beet, cucumber, pineapple, coconut, pomegranate, kiwi, mango, papaya, banana, watermelon and cantaloupe. The term "fruit juice" also refers to water extracted soluble solids, fruit juice concentrates, comminutes and purees.

Another embodiment of the present invention is the use of the concentrated liquid foodstuff obtained by the process of the present invention for the preparation of a ready-to-drink composition.

The following examples describe specific embodiments of the present invention.

EXAMPLES

Example 1: Rate of Gluconic Acid Production at Various Temperatures

In this Example, samples of 1 l sweetened tea mixture (40° Brix) were treated with 1000 ppm GOX (1650 units/g) and 1000 ppm CAT (16500 units/g) at various temperatures (40° C., 25° C. and 3° C., respectively). Constant supply of oxygen was given by pumping air in the concentrate with a glass aeration frit. The sweetened tea mixture consisted of the following constituents (w/w):

| | |
|---|---|
| Invert-sugar syrup (71.5° Brix): | 55.2% |
| Water: | 43.98% |
| Tea-extract: | 0.82% |

No additional buffering substance or base was added.

The results in FIG. 1 show that the rate of acid production, expressed as reduction of pH in time, is considerably lowered when the temperature is shifted away from the optimum condition of temperature between 25° C. and 40° C.

Example 2: Consecutive Treatments with GOX and CAT at 25° C.

A sample of 40° Brix sweetened tea mixture (composition according to Example 1) was treated with 1000 ppm GOX (1650 units/g) and 1000 ppm CAT (16500 units/g) consecutively for 4 times. Constant supply of oxygen was given by pumping air in the concentrate with a glass aeration frit and the whole process was held continuously at 25° C. After the first addition of the enzymes, the oxygen content of the concentrate dropped from initially 80-90% to about 3-5% within 1 hour. Both enzymes were added every 2-3 days, respectively. Hence, an all-over amount of 4000 ppm of each enzyme was added. The process was stopped after 11 days, when the pH finally dropped to 2.53 and a final amount of 13.3 g/L gluconic acid was analytically detected.

Example 3: Consecutive Treatments with GOX and CAT at 3° C.

A similar experiment as displayed in Example 2 was performed, with the difference that the temperature was held at 3° C. during the whole process. The reaction led to a final pH of 2.33, and 26.3 g/l gluconic acid was analytically detected after 11 days of incubation. Hence, an adjustment of the temperature away from the common optimum condition significantly increased the amount of produced gluconic acid at about 100% and lowered the pH of the concentrate to below 2.5.

Example 4: Pilot-Plant Trial

Figure 2:
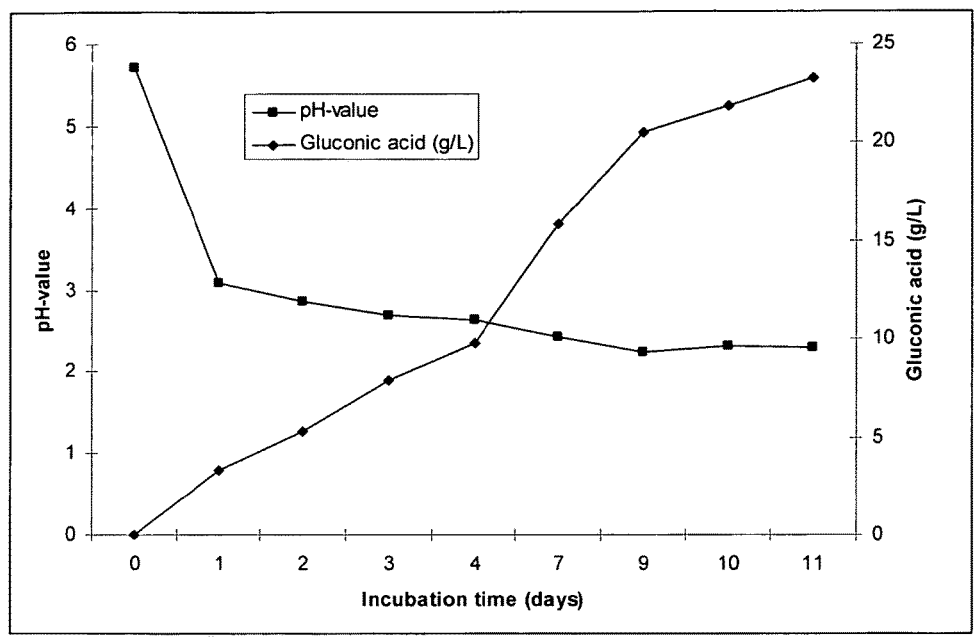
FIG. 2 illustrates the change in pH-value and gluconic acid concentration during the process.

Example 4 shows a pilot-plan trial for the production of a concentrated liquid foodstuff. 25 kg of 40° Brix sweetened tea mixture, (composition according to example 1) was treated with 1000 ppm GOX (1650 units/g) and 1000 ppm CAT (16500 units/g) consecutively for 4 times. Both enzymes were added every 2 days, respectively. Constant supply of oxygen was given by pumping air in the concentrate with a volumetric flow rate of 3 l/min. The whole process was held continuously at 3° C. by means of a tempered double-walled glass-vessel. The process was stopped after 11 days, when the pH reached 2.29 and a final amount of 23.3 g/l gluconic acid was analytically detected. FIG. 2 shows the change in pH-value and gluconic acid concentration during the process.

Example 5: Treatment with GOX and CAT Having High Efficiency

Figure 3:
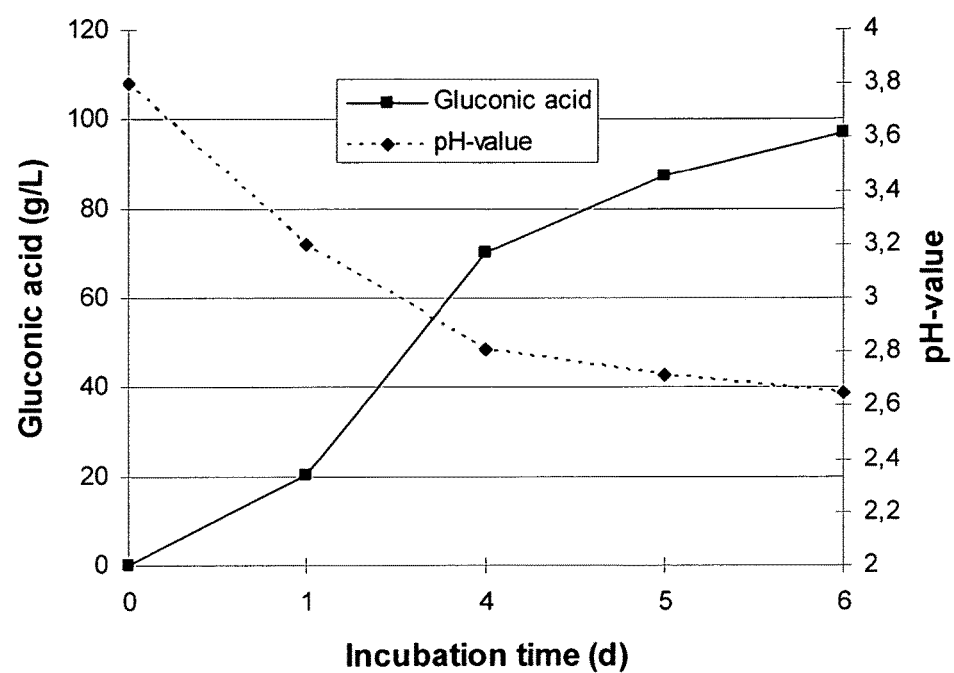
FIG. 3 illustrates the development of the pH-reduction and gluconic acid production during the process.

Commercial grape juice concentrate (65° Brix) was diluted with distilled water to 40° Brix. 800 g of this mixture was treated with 165 ppm GOX preparation (Gluzyme 1000 BG, Novozymes, with a declared activity of 10.000 units/g) and 660 ppm CAT preparation (Catazyme 25L, Novozymes with a declared activity of 25.000 units/g). Constant supply of oxygen was given by pumping air in the concentrate with a glass aeration frit and the whole process was held continuously at 3° C. for 6 days. After 6 days, the grape juice concentrate had a pH of about 2.6 and contained about 97 g/L gluconic acid. The concentrate was pasteurized at 85° C. for 1 min to inactivate residual enzyme activity. The development of the pH-reduction and gluconic acid production during the process is shown in FIG. 3.

Example 6: Subsequent Treatment of the Enzymatic Treated Concentrated Liquid Foodstuff with a Microbial Fermentation Culture The sour, enzyme treated concentrate of Example 5 was subsequently diluted with distilled water to 35° Brix and heated to 28° C. Then a commercial yeast preparation (SIHA—Aktiv Hefe 3, *Saccharomyces cerevisiae*, Begerow) was added in a concentration of 200 mg/L. After 30 h of incubation at 28° C., the brix was reduced by 1.5% to 33.5° Brix and 1% by volume of ethanol was produced in the concentrate, due to the metabolic action of the fermentation culture. The fermented concentrate was then pasteurized at 85° C. for 1 min to inactivate the yeast.

The fermented fruit juice concentrate was further diluted with mineral water to 4-8° Brix to create a refreshing sweet/sour spritzer-type of beverage with a delicious fermented taste.

NON-PATENT LITERATURE

Wong, C. M., Wong, K. H., Chen, X. D. (2008): Glucose oxidase; natural occurrence, function, properties and industrial applications, Applied Microbial Biotechnology; 78:927-938.

Bankar, S. B., Mahesh, V. B., Singhal, R. S., Ananthanarayan, L. (2009): Glucose oxidase—an overview; Biotechnology advances, 27:489-501.

Gibson, Q. H., Swoboda, B. E. P., Massey, V. (1964): Kinetics and Mechanism of Action of Glucose Oxidase; The Journal of Biological Chemistry, 239, 3927-3934

Miron J., Gonzales, M. P., Vasquez, J. A., Pastrana, L., Murado, M. A. (2004): A mathematical model for glucose oxidase kinetics, including inhibitory, deactivant and diffusional effects and their interactions. Enzyme and microbial technology 34:513-522.

Handbook of Food Enzymology, Eds.: Whitaker, J. R., Voragen, A. G. J., Wong, D., W., S. (2003), Marcel Dekker, New York, 425-432.

Hatzinikolaou, D. G., Hansen, O. C., Macris, B. J., Tingey, A., Kekos, D, Goodenough, P., Stougaard, A. (1996) New glucose oxidase from *Aspergillus niger*: characterization and regulation studies of enzyme and gene; Appl. Microbiol. Biotechnol. 46:371-381.

The invention claimed is:

1. A process of preparing a concentrated liquid foodstuff comprising:
  treating a sugar solution having a Brix of at least 30°, wherein the sugar solution comprises at least one component selected from the group consisting of fruits, berries, vegetables, herbs, nuts, spices, fungi, cereals, and crop products, with carbohydrate oxidase and catalase to convert the sugar in the sugar solution to an acid until a sufficient amount of the acid is produced to reach a pH lower than 2.5 without adjusting the pH before or during the treatment by addition of buffering substances or basic substances, wherein the basic substances are selected from $Ca(OH)_2$, KOH, NaOH, $Mg(OH)_2$, $CaCO_3$, $MgCO_3$, $Mg(OH)_2$, $Na_2CO_3$, $K_2CO_3$, $(NH_4)_2CO_3$, $NH_4OH$, $NaHCO_3$ or $KHCO_3$;
  to obtain the concentrated liquid foodstuff.

2. A process of preparing a concentrated liquid foodstuff comprising treating at least one liquid juice concentrate and/or at least one extract from fruits, berries, vegetables, herbs, nuts, spices, fungi, cereals, or crop products, said liquid juice concentrate and extract independently having a Brix of at least 30°, with carbohydrate oxidase and catalase to convert the sugar in the liquid juice concentrate and/or the extract to an acid until a sufficient amount of the acid is produced to reach a pH lower than 2.5 without adjusting the pH before or during the treatment by addition of buffering substances or basic substances, wherein the basic substances are selected from $Ca(OH)_2$, KOH, NaOH, $Mg(OH)_2$, $CaCO_3$, $MgCO_3$, $Mg(OH)_2$, $Na_2CO_3$, $K_2CO_3$, $(NH_4)_2CO_3$, $NH_4OH$, $NaHCO_3$ or $KHCO_3$;
  to obtain the concentrated liquid foodstuff.

3. The process according to claim 1 or claim 2 wherein the carbohydrate oxidase is selected from the group consisting of glucose oxidase, hexose oxidase and lactose oxidase.

4. The process according to claim 1 or claim 2 wherein the temperature during the treatment is between 0° and 30° C.

5. The process according to claim 1 or claim 2 wherein the treatment starts at a temperature of 10° to 30° C.

6. The process according to claim 1 or claim 2 wherein the temperature during the treatment is lowered to 0 to 10° C. as soon as the pH is lower than 4.

7. The process according to claim 1 or claim 2 wherein said sugar solution or liquid juice concentrate or extract further comprises at least one functional compound selected from the group consisting of a stabilizer, a color, a sweetener and a flavor.

8. The process according to claim 1 wherein the sugar in the sugar solution is selected from the group consisting of maltose, lactose, glucose, hexose, a hydrolyzed saccharose concentrate, an invert sugar syrup, a glucose syrup, a natural fruit sugar from fruit juice and fruit juice concentrate.

9. The process according to claim 1 or claim 2 wherein the concentrated liquid foodstuff further comprises an active starter culture.

10. The process according to claim 1 or claim 2 wherein the concentrated liquid foodstuff is subsequently treated with an active starter culture for fermentation.

11. The process according to claim 9 wherein the active starter culture is selected from the group consisting of the family of lactobacillaceae, bifodobacteriaceae, Acetobacteraceae, *Rhizopus, Aspergillus, Candidia, Geotrichum, Penicillium* and *Saccharomyces*.

12. The process according to claim 1 or claim 2 wherein the activity of carbohydrate oxidase is from 1000 units/g to 50000 units/g.

13. The process according to claim 1 or claim 2 wherein the activity of catalase is from 10000 units/g to 100000 units/g.

14. The process according to claim 10 wherein the active starter culture is selected from the group consisting of the family of lactobacillaceae, bifodobacteriaceae, Acetobacteraceae, *Rhizopus, Aspergillus, Candidia, Geotrichum, Penicillium* and *Saccharomyces*.

* * * * *